UNITED STATES PATENT OFFICE.

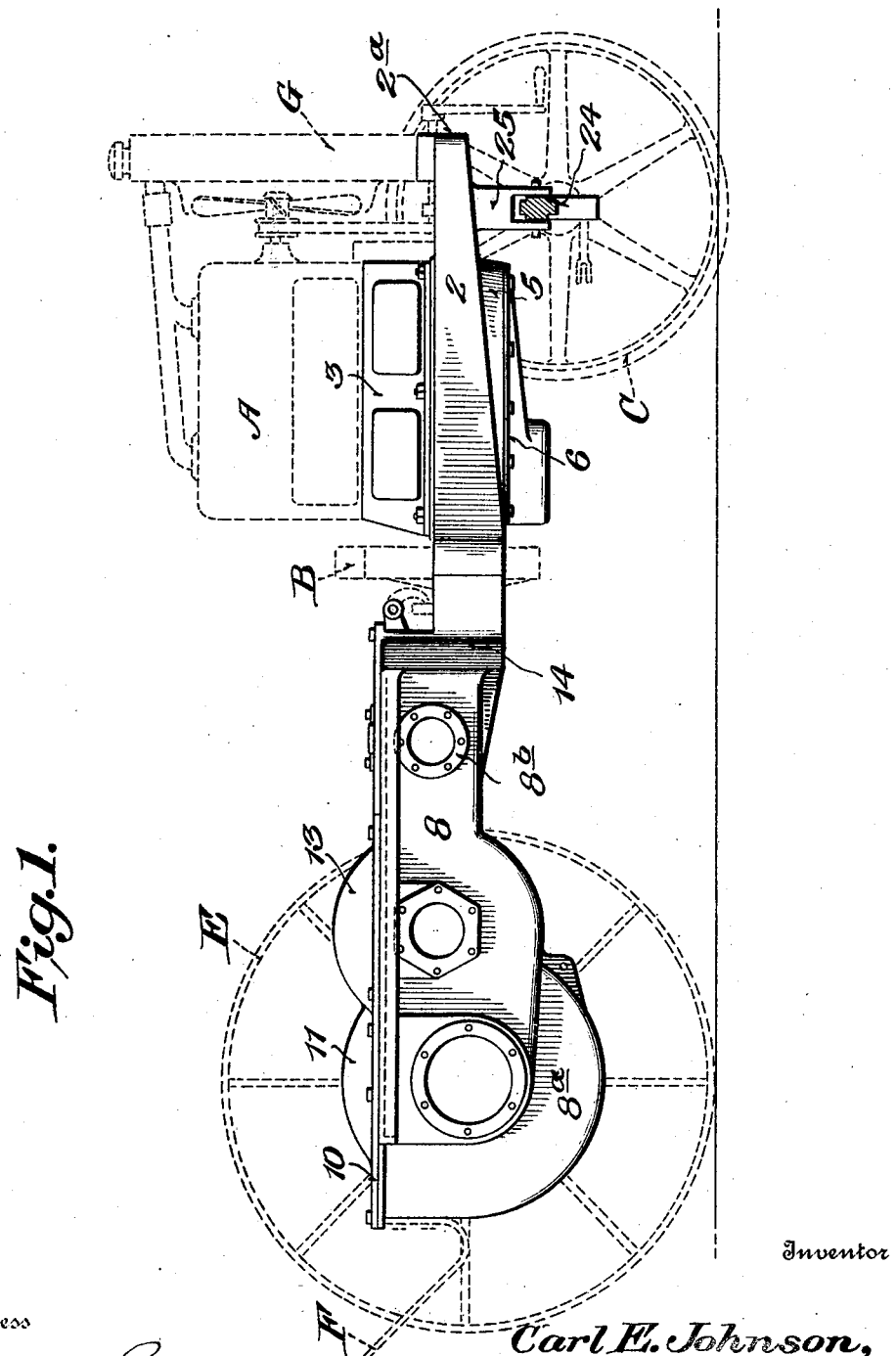

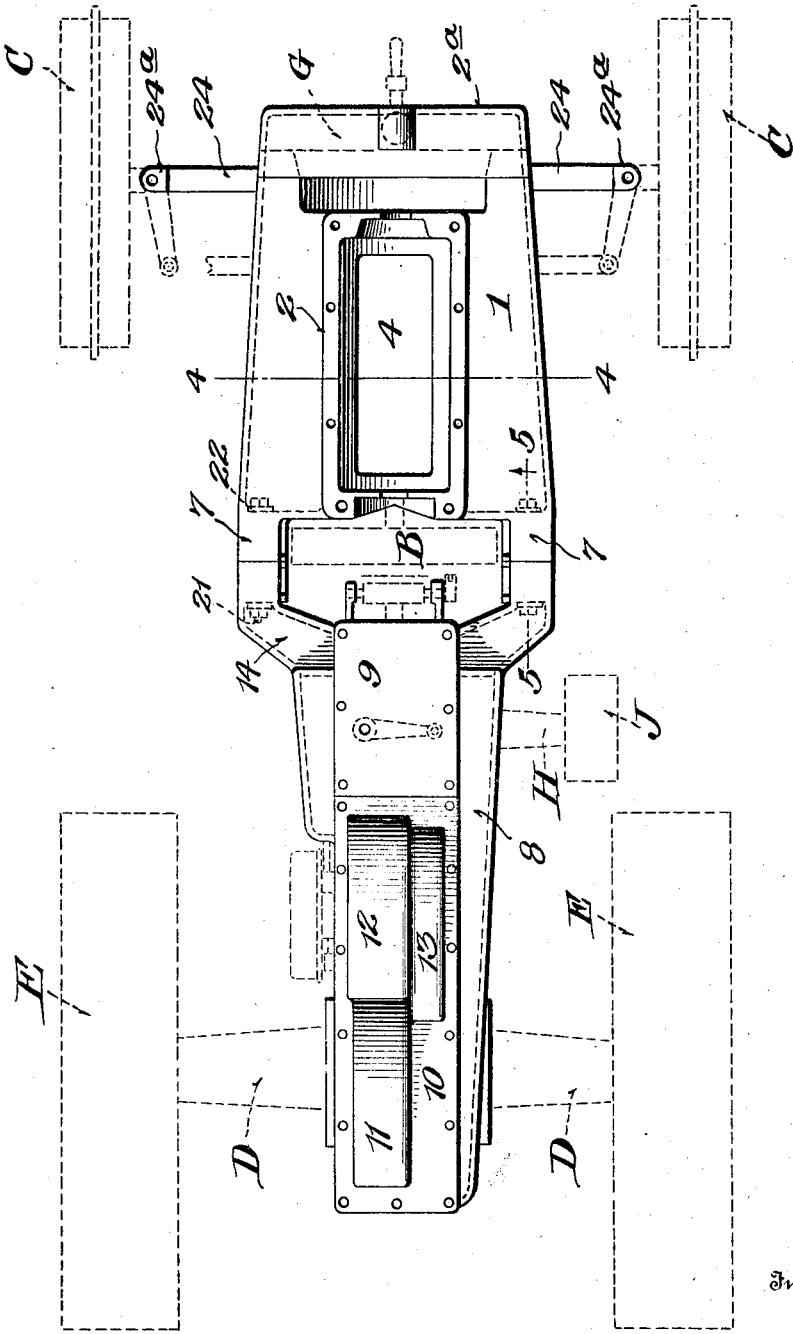

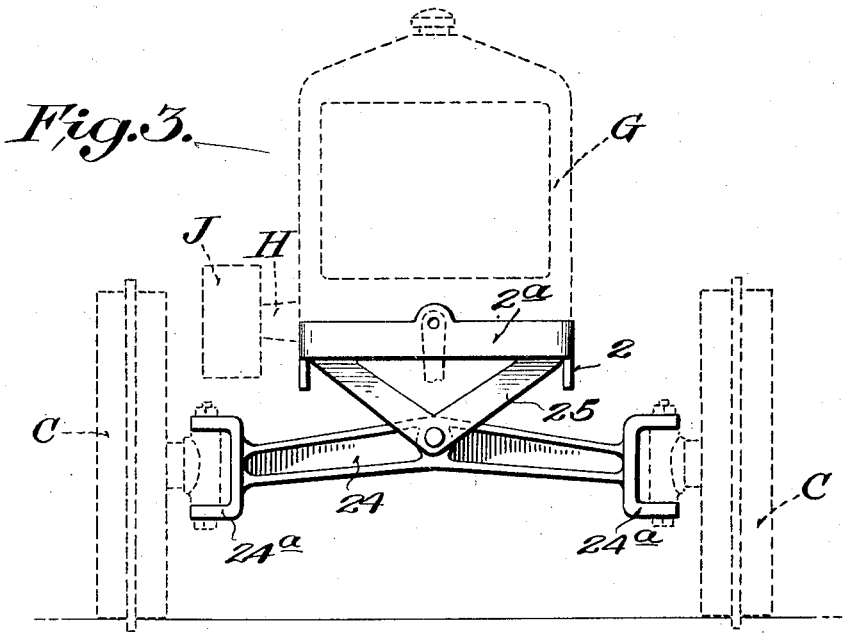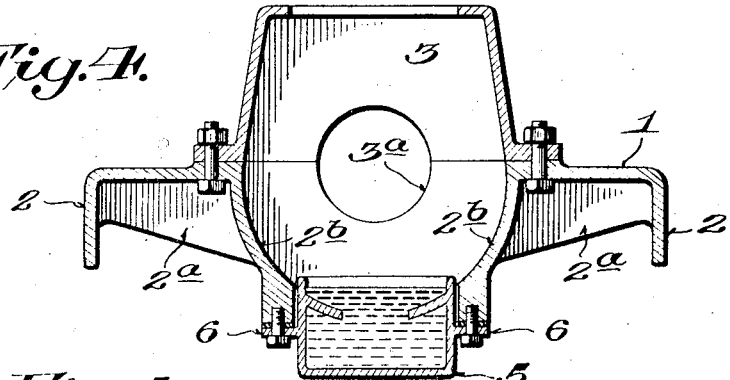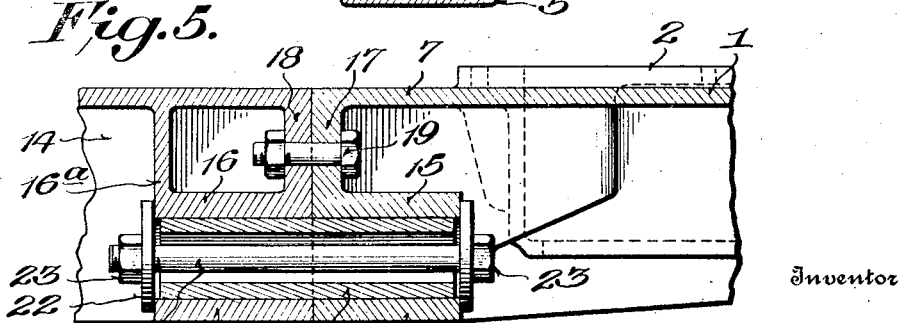

CARL E. JOHNSON, OF ST. PAUL, MINNESOTA.

COMBINED ENGINE AND VEHICLE FRAME.

1,353,245.   Specification of Letters Patent.   Patented Sept. 21, 1920.

Application filed October 10, 1918. Serial No. 257,568.

*To all whom it may concern:*

Be it known that I, CARL E. JOHNSON, a citizen of the United States, residing at St. Paul, in the county of Ramsey and State of Minnesota, have invented certain new and useful Improvements in Combined Engine and Vehicle Frames, of which the following is a specification.

This invention relates to combined engine housing or frame and vehicle body of the traction type.

One of the main problems in the construction of a tractor for farm work has been to produce a strong durable machine that can be sold at a price the average farmer can afford to pay, and in which the various parts of the engine can be removed or adjusted, or repaired without making it necessary to tear down the complete structure.

The usual custom has been to construct a vehicle body or frame and then mount a suitable engine with its framework, transmission, crank and gear housings, on or in some part of the vehicle frame. This requires the manufacture, assembling and shipping, as well as the purchasing, of two separate frames or bodies, that of the vehicle and that of the engine. In fact in the manufacture of the usual tractor those parts forming the vehicle and those related to the engine are often produced in different factories, and bear no special relation to each other.

To save this cost of time, labor and material is one of the main objects of the present invention.

Speaking broadly the invention consists of certain units which when assembled form both the body of the vehicle, the support for the engine, the crank case, the support for the oil reservoir, the transmission housing, and the gear casing. By forming these in two separate units, with the oil reservoir separate from either, I provide a device which can be shipped conveniently, set up at point of delivery, and in which one part can be removed without tearing down the entire structure.

In the accompanying drawings:—

Figure 1 is a side elevation of my housing or frame, associated parts being shown in dotted lines.

Fig. 2 is a top plan view of the frame, certain associated parts being in dotted lines.

Fig. 3 is a front elevation, parts being in dotted lines.

Fig. 4 is a section on the line 4—4 of Fig. 2.

Fig. 5 is a section on the line 5—5 of Fig. 2.

In the drawings 1 designates a flat metal plate or frame having depending side flanges 2 and end flanges 2ª. A boxing 3 is mounted on the frame 1, covering a central opening 4, and forms the upper part of the engine crank casing, the lower portion being formed by depending inner flanges 2ᵇ carried by the frame 1 and curving slightly inwardly.

Within the opening inclosed by the lower portions of these inner flanges 2ᵇ fits an oil reservoir 5, provided with lateral ribs 6 by means of which it may be secured to the lower thickened edges of the flanges.

As shown in Fig. 4 there is thus formed a crank case for the engine, the ends of the casing so formed having shaft openings 3ª.

The frame 1 and boxing 3 form one unit. A second unit is formed by a rear metal housing 8 which carries the transmission devices, gearing, etc., the rear shaft and gearing housing being designated at 8ª. Cover plates 9 and 10 are provided for the housing 8, with gear caps 11, 12 and 13. This forms the second unit. These units when connected form also the frame or body of the tractor.

To connect the units and allow for bending strains due to travel over uneven ground, I form rearwardly extending lugs 7 on the frame 1 and a forwardly extending yoke on the housing 8. The joint thus formed by the registration of the lugs and the forward ends of the yoke is illustrated in detail in Fig. 5. The lugs and yoke carry alining sleeves 15 and 16 connected to their outer walls, respectively, by partitions 17, 18 and 16ª. The partitions 17, 18, on each side of the machine, being connected by a bolt 19.

In the sleeves 15, 16, is a bushing 20 of less length than the combined length of the sleeves. A bolt 21 runs through the sleeves and projects therefrom, and is secured by collars 22 and nuts 23, the collars bearing on the sleeves but not on the bushing, thereby allowing for bending strains due to undulating ground.

A front axle 24 with its knuckle brackets 24ª may also be considered as part of the framework as on same is mounted midway its ends a V-bracket 25 which supports the frame 1.

The body or units 1 and 8 have a three point suspension, viz. the V-bracket 25 at the front and the two bearings on the rear axle. The engine and driving, steering and other operating mechanism do not form part of the present invention, but to show the general relation between them and the parts above described I have shown in dotted lines the following parts: The engine A, flywheel B, front wheels C, rear axle D, rear wheels E, seat support F, radiator G, brake pulley J, and its shaft housing H, which is bolted to the ring plate 8ᵇ.

It is thought that the above description with the drawings will make the construction, objects and advantages of the invention clear to those skilled in the manufacture and use of tractor devices.

What I claim is:—

A combined engine, transmission and gear casing adapted to form also a tractor vehicle body and in two detachable units, one of said units being supported by one axle of the vehicle and the other by the other axle, lugs carried by one unit, a yoke carried by the other adapted to register with the lugs, alining sleeves carried respectively by the yoke and lugs, bushings in said sleeves of less length than the sleeves, bolts passing through the sleeves and bushings, and collars on the bolts bearing on the sleeves and out of contact with the bushings, as and for the purpose set forth.

In testimony whereof I affix my signature.

CARL E. JOHNSON.